United States Patent
Sevindik et al.

(10) Patent No.: US 11,272,542 B1
(45) Date of Patent: Mar. 8, 2022

(54) LTE AND WIFI TRANSMISSION COORDINATION USING NETWORK ALLOCATION VECTOR

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/089,947

(22) Filed: Nov. 5, 2020

(51) Int. Cl.
| | |
|---|---|
| *H04W 74/08* | (2009.01) |
| *H04W 76/11* | (2018.01) |
| *H04L 101/654* | (2022.01) |
| *H04W 8/08* | (2009.01) |
| *H04W 84/12* | (2009.01) |

(52) U.S. Cl.
CPC ..... *H04W 74/0816* (2013.01); *H04L 61/6054* (2013.01); *H04W 8/08* (2013.01); *H04W 76/11* (2018.02); *H04W 84/12* (2013.01)

(58) Field of Classification Search
CPC ..... H04W 84/12; H04W 16/14; H04W 88/06; H04W 88/10; H04W 74/02; H04W 74/0816; H04W 48/20; H04W 72/0406; H04W 72/04; H04W 76/38; H04W 76/11; H04W 24/02; H04W 36/08; H04W 36/0055; H04W 36/00837; H04W 8/08; H04L 5/0098

See application file for complete search history.

(56) References Cited

U.S. PATENT DOCUMENTS

| | | | |
|---|---|---|---|
| 8,451,816 B2 | 5/2013 | Karaoguz et al. | |
| 8,971,182 B2 | 3/2015 | Lee et al. | |
| 9,674,850 B2 | 6/2017 | Tian et al. | |
| 9,894,586 B2 | 2/2018 | Sirotkin et al. | |
| 2004/0170191 A1* | 9/2004 | Guo | H04W 36/0088 370/468 |
| 2014/0293800 A1* | 10/2014 | Xie | H04W 40/246 370/252 |
| 2021/0307064 A1* | 9/2021 | Ryu | H04W 74/00 |

FOREIGN PATENT DOCUMENTS

| | | |
|---|---|---|
| EP | 2 925 055 B1 | 2/2017 |
| EP | 2 873 270 B1 | 4/2019 |

* cited by examiner

*Primary Examiner* — Ricardo H Castaneyra
(74) *Attorney, Agent, or Firm* — Meagher Emanuel Laks Goldberg & Liao, LLP

(57) ABSTRACT

Various embodiments comprise systems, methods, architectures, mechanisms and apparatus for managing user equipment (UE) communications in a converged network by inserting mobile network UE information into WiFi network communications such that a WiFi control entity may cause migration of the UE from the WiFi network to the mobile network in response to determining that a QoS level is deteriorating.

15 Claims, 2 Drawing Sheets

LTE AND WIFI TRANSMISSION COORDINATION USING NETWORK ALLOCATION VECTOR

FIELD OF THE DISCLOSURE

The present disclosure generally relates to wireless communications systems and related networks, and more particularly to mechanisms supporting seamless automatic migration of user equipment (UE) between radio access networks (RANs).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as Universal Mobile Telecommunications Systems (UMTSs), Long Term Evolution (LTE), and 5th Generation New Radio (5G-NR) described and being developed by the Third Generation Partnership Project (3GPP), are increasingly relying on wireless macrocell radio access networks (RANs) such as traditional cellular base stations, eNodeBs and the like, along with wireless small cell or microcell RANs in order to deploy, for example, indoor voice and data services to enterprises and other customers. For both macrocell RANs and small/micro cell RANs, increasing demands for wireless throughput make access to additional wireless spectrum desirable. An example of additional spectrum which is becoming available is that of the citizens broadband radio service (CBRS), a 150 MZ band between 3.55 GHz and 3.70 GHz. Access is currently granted to Citizens Broadband Radio Service Devices (CBSDs) operating according to a Generic Authorized Access (GAA) from 3.55 GHz to 3.65 GHz, with full access to 3.70 GHz expected in the future.

Converged networks contemplate that user equipment (UE) utilizing network services (e.g., voice, streaming media, data upload/download etc.) may access any available/compatible network, such as a WiFi network (e.g., 802.11xx networks) or UMTS network.

Within the context of WiFi networks, a network allocation vector (NAV) is used by UE such as mobile phones to signal a waiting time before accessing the network (also as a virtual carrier sensing mechanism). Specifically, a connected UE signals a NAV that is selected according to (1) the expected UE data transmission time, and (2) the expected NACK/ACK time for the data transmitted. That is, the NAV set by the connected UE is generally equal to the time for data transmission and related acknowledgment of the UE currently transmitting/receiving data. Other UE will wait in an idle state for the duration of the NAV countdown before trying to access to the network. These idle times/moments become problematic with increasing number of WiFi-enabled UE and interference in WiFi bands.

SUMMARY

Various deficiencies in the prior art are addressed by systems, apparatus, and methods for managing user equipment (UE) communications in a converged network by inserting mobile network UE information into WiFi network communications such that a WiFi control entity may cause migration of the UE from the WiFi network to the mobile network in response to determining that a QoS level is deteriorating.

A method according to one embodiment comprises receiving, at a wireless access point (WAP) communicating with UE previously attached to a mobile network, respective UE network allocation vector (NAV) information and respective UE WiFi frames including WiFi frames having a Connection Information (CI) field having stored therein a corresponding UE identifier; and forwarding, toward a WiFi controller configured to manage the WAP and the UE connected to the WAP, one or more messages including the identifier of UE exhibiting NAV values above a threshold amount, said one or more messages configured to cause the WiFi controller to initiate a migration of UE exhibiting NAV values above the threshold amount to the mobile network.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
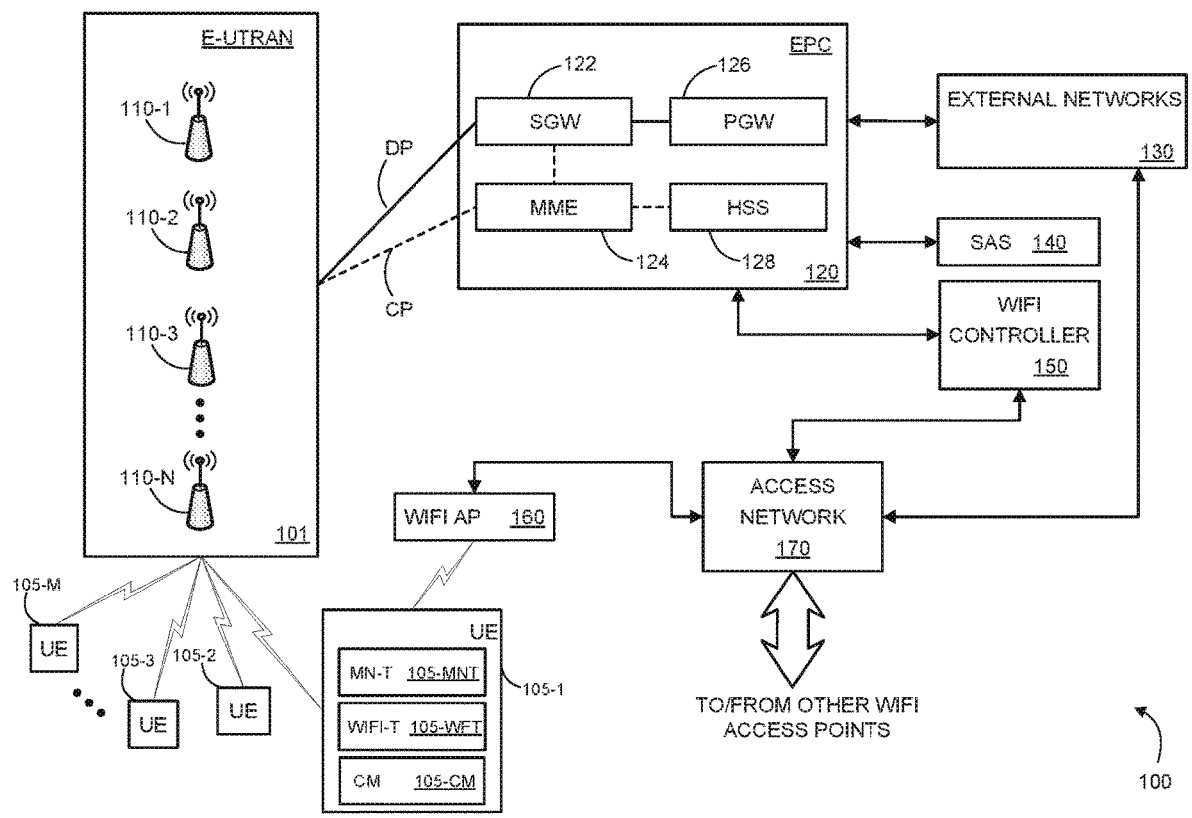
FIG. 1 depicts a block diagram of a network services architecture suitable for use in various embodiments.

FIG. 1 depicts a block diagram of a network services architecture suitable for use in various embodiments. Specifically, FIG. 1 depicts a converged network services architecture in which user equipment (UE) utilizing network services (e.g., voice, streaming media, data upload/download etc.) may access any available/compatible network as long as the quality of service (QoS) requirements of the relevant network services are satisfied, such as a WiFi network (e.g., 802.11xx networks) or mobile network (e.g., 3G, 4G/LTE, 5G).

Specifically, user equipment (UE) 105-1 through 105-M (collectively UE 105) are depicted as being configured for wirelessly communicating with one or more mobile network nodes 100-1 through 110-N (collectively nodes 110), the nodes 110 forming a E-UTRAN (e.g., LTE access network) 101 which is connected to an evolved packet core (EPC) 120 so as to provide thereby network services, such as from/to external networks 130. The UE 105 is also depicted as depicted as being configured for wirelessly communicating with a WiFi Access Point (WAP or AP) 160 which is connected to a WiFi Controller 150 via, illustratively, an access network 170 such as provided by a telecommunications, cable television, and/or other network services provider.

The WAP 160 may comprise an access point such as an 802.11xx wireless access point at a home, business or other location configured to communicate with UE 105 and with an access network 170. In various embodiments, a network services provider utilizes numerous such access points distributed over a "coverage footprint" to provide network services to mobile devices such as the UE 105 discussed herein.

The nodes 110 may comprise macrocells, small cells, microcells and the like such as eNodeBs, cellular network base stations, 4G/5G repeaters, and similar types of provider equipment. The nodes 110 may include nodes that use licensed 3G/4G/LTE/5G spectrum, unlicensed spectrum such as citizens broadband radio service (CBRS) spectrum, or a combination of licensed and unlicensed spectrum. In the case of nodes 110 having Citizens Broadband Radio Service Device (CBSD) capability, allocations of CBRS spectrum are provided via a Spectrum Access System (SAS) 140.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE that use licensed 3G/4G/LTE/5G spectrum, unlicensed spectrum such as CBRS spectrum, or a combination of licensed and unlicensed spectrum. In the case of nodes 110 having CBSD capability, allocations of CBRS spectrum are provided via 140. The various embodiments contemplate the UE are configured to communicate via at least one mobile network (MN) radio access technology (RAT) such as 3G, 4G/LTE, and 5G, and at least one WiFi access point technology such as 802.11xx (e.g., 802.11b, 802.11a, 802.11g, 802.11n, 802.11ac, 802.11ax and so on).

The UE 105 comprises a mobile network transceiver 105-MNT configured for communications with any of nodes 110, a WiFi transceiver 105-WFT configured for communication with WAP 160, and a connection manager 105-CM configured to manage communications with the nodes 110 and APs 160, and to facilitate handoffs and UE migration between different nodes 110, between different APs 160, and between a node 110 and a WAP 160 as described herein. The UE 105 also comprises various other components, modules, antennas, and the like (not shown).

The connection manager 105-CM may be configured to cause the UE to give priority to WiFi connections when the UE becomes IDLE in 4G network, as discussed below with respect to FIG. 3. Further, the connection manager 105-CM may be configured to insert a UE identifier such as a international mobile subscriber identifier (IMSI) of the UE into a "Connection Information" field included within some or all of the WiFi frames transmitted to the WAP 160 so that the WAP 160 knows the IMSI of connected UE, thereby facilitating rapid migration of such UE from the WiFi network of a WAP 160 to the mobile network of a MN node 110. Other UE identifiers may also be used depending on the type of UE, provider equipment, network protocols, regulatory requirements and the like, such as a International Mobile Equipment Identity (IMEI), a mobile equipment identifier (MEID), an Electronic serial numbers (ESN) and so on. The connection manager 105-CM may be configured to sense the type of connection or radio access network (RAN) currently used by the UE, and to store authentication, location information, subscriber identification and the like associated with the currently used RAN and any previously used RAN.

The nodes 110 are configured to communicate with user equipment (UE) 105 as discussed herein. While the nodes 110 and UE 105 may operate in accordance with various radio access technologies (RATs), the embodiments will be discussed within the context of those nodes 110 and UE 105 configured to communicate with each other as Citizens Broadband Radio Service Devices (CBSDs) configured for operation within the Citizens Broadband Radio Service (CBRS), such as the 100 MHz band from 3.55 GHz to 3.65 GHz, the 150 MZ band between 3.55 GHz and 3.70 GHz, or some other spectral range as defined by the relevant authorities.

As depicted, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128. Other network and management elements are typically included within or used to manage an evolved packet core and related communications therewith as will be known to those skilled in the art.

The SGW 122 and PGW 126 handle user data or data plane (DP) functions; they transport the internet protocol (IP) data traffic (i.e., incoming and outgoing packets)

between the User Equipment (UE) 105 and the external networks 130. The external networks 130 may comprise any external network, such as an IP Multimedia Core Network Subsystem (IMS).

The SGW 122 is a point of interconnect between the radio-side (e.g., via a backhaul connection to the E-UTRAN 101 as depicted or some other wireless network) and the EPC 120. As its name indicates, this gateway serves the UE by routing the incoming and outgoing IP packets. The SGW 122 is the anchor point for intra-LTE mobility (i.e. in case of handover between eNodeBs 110) and between LTE and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of UE in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

An EPC control plane signaling path CP may be used to provide information such as UE messages or signaling may be provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

As depicted in FIG. 1, a Spectrum Access System (SAS) 140 communicates with the EPC 120 and is configured to control access to the CBRS frequency band for RANs and other CBSD devices such as nodes 110 and UEs 105. Generally speaking, the SAS 140 is configured to ensure that the CBRS frequency band is allocated in accordance with the regulations promulgated by the relevant authorities. The SAS 140 may also communicate with the network manager 150 to perform various tasks in accordance with the embodiments.

As depicted in FIG. 1, a WiFi controller (WC) 150 communicates with a WiFi Access Point (WAP or AP) 160 via an access network 170. For simplification of the discussion, only one WAP 160 is shown in FIG. 1 as communicating with WiFi controller 150, and only one UE 105 (i.e., UE 105-1) is shown in FIG. 1 as communicating with that WAP 160. The WiFi controller 150, which may be implemented via a general purpose computer server, network operations center (NOC) equipment, or other provider equipment, is configured to perform various WiFi control functions associated with a large number of APs 160, as well as an even larger number of UEs 105 configured to communicate with the various APs 160.

The WC 150 may include a WiFi resource management mechanism which manages the coverage, the capacity, and/or other characteristics of individual WAPs 160 in order to optimize the quality of the services delivered to UE 105 via the WAPs 160. The population of WAPs to be managed may run into the tens or hundreds of thousands, including WAPs that support both private and public WiFi access. Each WAP is associated with a maximum number of WiFi users (UE) that may be connected at any given time. Each connected user must be managed by the WAP. Further, since each WAP may provide one or more carrier signals having formed thereon respective communications channels (illustratively, eleven in basic 802.11 schemes), each WAP must also manage its various channels including inter-channel interference and the like (e.g., by selecting the channels experiencing the least amount of interference).

Generally speaking, the WiFi controller (WC) 150 manages various operational aspects of the WAPs 160 and UE 105 connected thereto in accordance with WAP policies, subscriber/user profiles (e.g., such as defined in service level agreements) and the like. For example, each UE may be associated with a corresponding subscriber/user profile having defined therein guaranteed minimum levels of service, such as a minimum WAP download (DL) throughput, minimum upload (UL) throughput, and/or other minimum QoS levels.

The system 100 of FIG. 1 contemplates UE 105 associated with a network services provider capable of providing network services via either of a mobile network (e.g., 3G/4G/LTE/5G network) or a WiFi network (e.g., 802.11xx network). The WC 150 is configured to enable UE 105 to receive the appropriate QoS when connected to a WAP 160 (e.g., per subscriber policy), and that the WAP 160 is configured to provide the appropriate QoS to the UE 105.

As discussed below with respect to FIG. 2, UE 105 authenticated to the mobile network (e.g., E-UTRAN network 101) may be opportunistically migrated to the WiFi network (e.g., connected to a WAP 160), and may provide mobile network information (e.g., IMSI and location data) via the WiFi network to the WC 150 to enable, illustratively, rapid and seamless migration of the UE 105 back to the mobile network. That is, since the WC 150 also communicates with the EPC 120 (e.g., with MME 124), the WC 150 is able to provide information to the MME 124 (e.g., UE IMSI, WAP 160 location and the like) suitable for use in rapidly migrating UE from coordinate the delivery of network services to subscriber/user UE 105.

Various elements or portions thereof depicted in FIG. 1 and having functions described herein are implemented at least in part as computing devices having communications capabilities, including for example the UE 105, nodes 110, SAS 140, WC 150, WAP 160 and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein.

Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

CBSD Registration & Deregistration

Generally speaking, before a new CBSD (e.g., a node 110 being added to the network 101) can transmit in the CBRS frequency band, it needs to register with the SAS 140. The CBSD sends a registration request to the SAS 140 containing information about its installation parameters, such at the owner, location, and transmit characteristics of a node 110. The SAS 140 responds to the CBSD with a registration response. If the SAS 140 approves the registration request, then the SAS 140 will respond with a CBSD ID, and the CBSD is registered. If the SAS 140 rejects the registration request, then the SAS 140 will respond with an error message. The CBSD needs to correct the error and send another registration request.

Normally the CBSD requires CPI validation. In a single-step registration process, the CPI provides the installation parameters of the CBSD (signed with its own CPI certificate) to the CBSD. Then, the CBSD sends a registration request to the SAS including the signed installation parameters in a "cpiSignatureData" field. In a multi-step registration process, the CPI uses the SAS Portal (or another user interface that's integrated with the SAS Portal) to send the installation parameters to the SAS. Then, the CBSD sends a registration request to the SAS without installation parameters. The SAS combines the information from the SAS Portal and the CBSD to process the registration request.

If a CBSD needs to be decommissioned or simply moved, it will first send a deregistration request to the SAS. Thereby indicating that the CBSD no longer wishes to be listed in the SAS with the parameters that it sent in its registration request.

If a CBSD subsequently needs to transmit again, then the CBSD may send a registration request with updated parameters later.

Therefore, in operation a CBSD such as a node 110 registers with the SAS 140 (directly or via PE such as a network manager) by providing the SAS 140 with location and capability information as discussed above.

A UE wireless device such as a user terminal, fixed wireless access device, IoT device or other UE waits for authorization from its corresponding CBSD (e.g., corresponding node 110) before transmitting in the CBRS frequency band. Each CBSD such as a node 110 operating within the CBRS frequency band will transmit and receive wireless data within one or more respective coverage areas as discussed above, wherein some of the coverage areas may be overlapping.

Connection Manager and Connection Information

Various embodiments contemplate systems, methods, mechanisms and the like to reduce idle moments in UE converged network communications by dynamically migrating users between WiFi networks (e.g., 802.11xx) and mobile networks (e.g., 3G, 4G/LTE, 5G) by updating and maintaining UE information for each network (e.g., identification/attachment information), using congestion-indicative information to opportunistically identify UE handoff/migration opportunities, and rapidly executing handoff/migration of one or more UE using the updated/maintained UE information.

An indicator of WiFi network utilization level is a network allocation vector (NAV), which is used by UE such as mobile phones to signal to other UE an amount of time for the other UE to wait before accessing the same WiFi network channel; essentially a virtual count-down from some number that, when reaching zero, triggers access to the network. Thus, the NAV may be used as a virtual carrier sensing mechanism for UE accessing transmission channels in a WiFi network.

The connected UE indicates a NAV is set by a UE connected to a WiFi channel according to (1) the expected UE data transmission time, and (2) the expected NACK/ACK time for the data transmitted. That is, the NAV set by the connected UE is generally equal to the expected time for data transmission/reception and related acknowledgment of the UE currently transmitting/receiving data. To avoid collisions and conserve battery power, other UE will wait in an idle state for at least the duration of the NAV countdown before trying to access to the network. These idle times/moments become problematic with increasing number of WiFi-enabled UE and interference in WiFi bands.

In various embodiments, the structure of the WiFi frame use by UE to communicate with the WAP is modified to include a "Connection Information" field implemented as part of a data or payload portion of a frame, part of header portion of a frame, part of a reserved frame type or subtype, or via some other modification to the WiFi frame or packet structure. By communicating the IMSI of the UE with each WiFi frame such as via the Connection Information field, the WAP 160 and WC 150 know exactly which UEs are connected to the WAP 160. In this manner, a decision to migrate one or more UE from a WAP 160 to a MN node 110 may be quickly executed by forwarding the known IMSI of the UE to the MME to initiate thereby the MN attachment procedure. This decision may be made by the WC 150 or some other management entity.

TABLE 1

| Simplified 802.11 Frame Format | | | | | | | | |
|---|---|---|---|---|---|---|---|---|
| FC | D/I | Add1 | Add2 | Add3 | Sequence control | Add4 | Frame body | Frame check seq |

An 802.11 frame format such as may be used in the various embodiments generally comprises a plurality of fields concatenated as follows (including optional fields and frame-type specific fields), as follows:

Frame Control (FC, 2 octets): Indicates the type of frame (control, management, or data) and provides control information. Control information includes whether the frame is to or from a DS, fragmentation information, and privacy information.

Duration/Connection ID (D/I, 2 octets): If used as a duration field, indicates the time (in microseconds) the channel will be allocated for successful transmission of a MAC frame. In some control frames, this field contains an association, or connection, identifier.

Address 1 (6 octets): Receiver Address for all frame types.

Address 2 (6 octets): Transmitter Address for all frame types.

Address 3 (6 octets): BSSID for management frames, BSSID or source address (SA) or destination address (DA) for data frames.

Sequence Control (6 octets): Contains a 4-bit fragment number subfield, used for frag-mentation and reassembly, and a 12-bit sequence number used to number frames sent between a given transmitter and receiver.

Address 4 (6 octets) BSSID or SA for data frames.

Frame Body (0 to 2312 octets): Contains a medium access control (MAC) service data unit (MSDU) or a fragment of an MSDU. The MSDU is a LLC protocol data unit or MAC control information.

Frame Check Sequence (4 octets): A 32-bit cyclic redundancy check.

The transmitter address and receiver address are the MAC addresses of stations joined to the WAP that are transmitting and receiving frames over the wireless LAN. The service set ID (SSID) identifies the wireless LAN over which a frame is transmitted. The source address and destination address are the MAC addresses of stations, wireless or otherwise, that are the ultimate source and destination of this frame.

Various embodiments contemplate a communication mechanism for NAV in which, for example, the MAC layer frame headers contain a duration field that specifies the transmission time required for the frame, during which time the medium will be busy. The stations listening on the wireless medium read the Duration field (D/I field in the picture) and set their NAV, which is an indicator for a station on how long it must defer from accessing the medium. In this manner, all UEs decode a header part of MAC frames that other UEs are sending over the air, and read duration fields of these MAC frames in order to set their own NAV values (i.e., to set a 'wait time' before accessing to medium).

Figure 2:
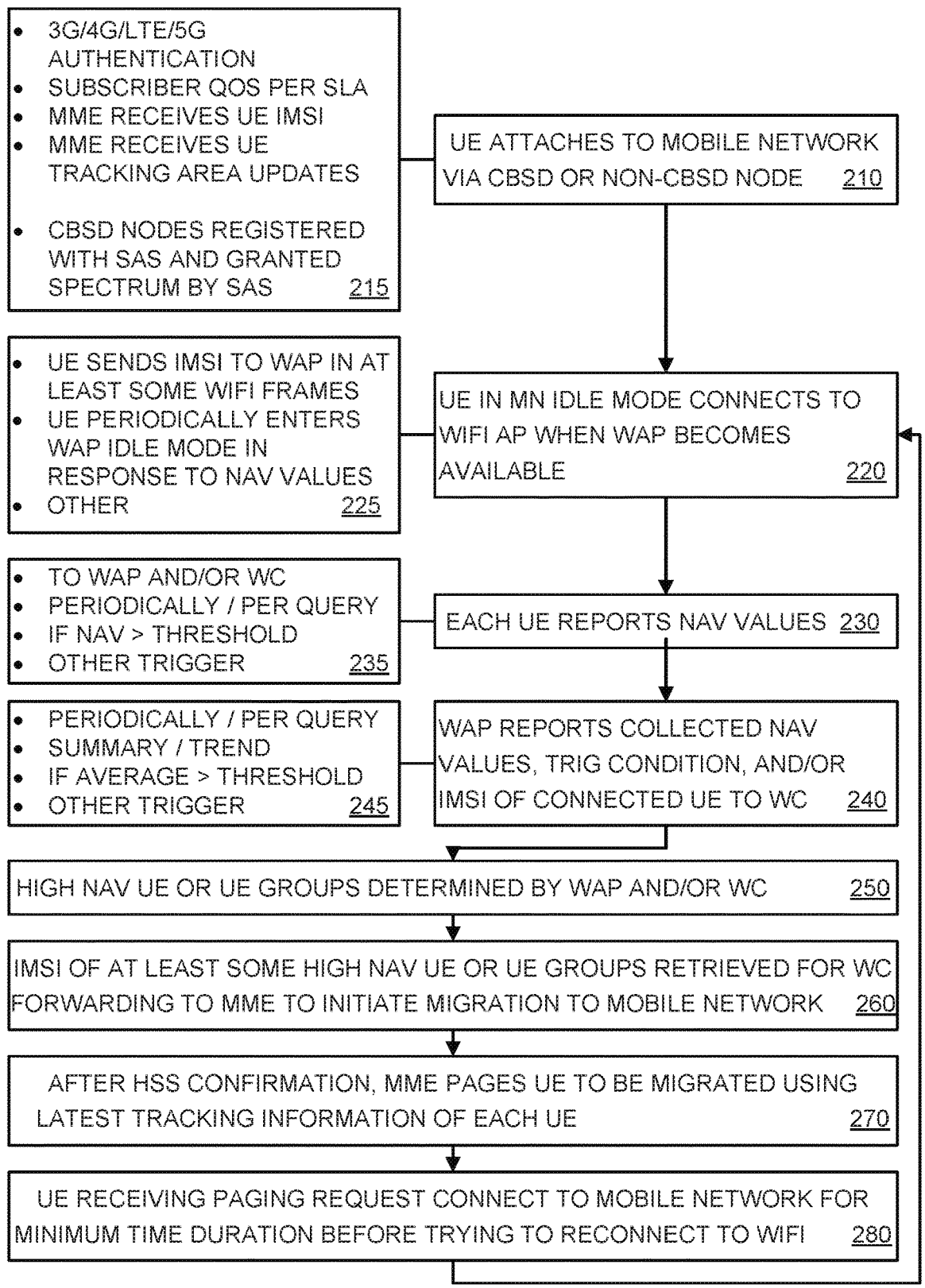
FIG. 2 depicts a flow diagram of a communications management method according to an embodiment.

FIG. 2 depicts a flow diagram of a communications management method according to an embodiment. The method 200 of FIG. 2 contemplates various functions performed by UE 105, nodes 110, SAS 140, WC 150, WAP 160, and other functional entities as described above with respect to FIG. 1.

Generally speaking, the method 200 of FIG. 2 is directed to managing UE 105 associated with a network services provider capable of providing network services via either of a mobile network (e.g., 3G/4G/LTE/5G network) or a WiFi network (e.g., 802.11xx network). The method 200 contemplates that UE 105 authenticated to the mobile network and opportunistically migrated to the WiFi network while also providing mobile network information to the WC 150 to enable thereby a rapid and seamless migration of the UE back to the mobile network.

At step 210, UE attached to the mobile network via a CBSD node 110 or a non-CBSD node 110 (e.g., UE 105 attaches to a node 110 of a 3G, 4G/LTE, or 5G mobile network). Referring to box 215, the attachment comprises various known steps such as the UE being authenticated by the mobile network, and the UE being associated with a subscriber having a service level agreement (SLA) defining quality of service (QoS) and other metrics of network services to be provided to the subscriber. The international mobile subscriber identifier (IMSI) of the UE (or other identifier) and other information is provided to the MME, along with the current tracking area of the UE, which is periodically updated as the UE location moves between different nodes 110 or sectors thereof. Other functions are also contemplated during this attachment as is known. It is noted that the a CBSD node 110 is mobile network node that has previously been registered with the SAS 140, and which has been granted spectrum by the SAS 140 for use in communicating with UE 105 and for performing other functions as is known.

At step 220, UE currently in a mobile network idle mode (still authenticated to the MN, but not currently receiving network services from the MN) searches for a WiFi Access Point (WAP or AP) such as WAP 160 and, if a WAP is available, connects to the WAP. At which time the UE begins obtaining networks services such as voice, streaming media, sensor upload/download and/or other network services via the WAP 160 rather than via a node 110.

Referring to box 225, the UE connects to and begins receiving network services from the WAP (e.g., from a specific one or more channels of the WAP). The UE includes its IMSI in some or all of the WiFi frames sent to the WAP within a "Connection Information" field implemented as part of a data or payload portion of a frame, part of header portion of a frame, part of a reserved frame type or subtype, or via some other modification to the WiFi frame or packet structure.

Further, all UE receiving network services from the WAP enter and exit a WAP idle mode associated with their respective one or more channels of the WAP they are using in response to respective one or more NAV values associated with UE currently using those one or more channels of the WAP.

At step 230, each UE reports its NAV values. Referring to box 235, the NAV values (e.g., individual, average and/or trend) of the UE may be reported to the WAP 160 or directly to the WC 150, the NAV values of the UE may be reported periodically, in response to a query, if greater than a threshold level, and/or if some other triggering condition being met.

At step 240, each WAP 160 reports the collected NAV values (e.g., actual, rolling average etc.) and/or trigger condition levels (e.g., individual or group average and/or trend), and (optionally) the stored IMSI of currently connected UE to the WC 150. Referring to box 245, the NAV values of each WAP 160 may be reported to the WC 150 either periodically, in response to a query, if greater than a threshold level, and/or in response to some other triggering condition being met. Optionally, the IMSI values extracted from WiFi frame received from the UE serviced by the WAP 160 may be reported to the WC 150 along with the NAV values.

At step 250, UE or group(s) of UE (e.g., UE attached to a particular WAP, or UE from a particular customer/company) exhibiting nigh NAV values are determined by the WAP or WC. This determination may be made with respect to minimum desired NAV values for any UE, respective minimum desired NAV values for UE of differing classes (e.g., gold, silver, bronze subscription tiers), NAV values of UE associated with specific customers or users and so on. Generally speaking, the NAV values are used as a proxy for congestion or QoS, and UE are migrated to the MN to reduce such congestion and/or improve QoS for both migrated and non-migrated UE.

At step 260, the IMSI or other identifier of the determined UE or group(s) of UE to be migrated are obtained from WAP(s) supporting the determined UE (or data already stored at the WP 150 for the WAP(s) 160). As previously noted, each WAP 160 knows the IMSI of each UE 105 communicating with the WAP 160 due to the UE 105 inserting its IMSI into a Connection Information" field in each WiFi frame transmitted to the WAP. As such, there is no need to obtain the IMSI from the UE at this time, though a request message may optionally be transmitted to the UE to verify UE connection and/or IMSI.

At step 270, after the MME receives subscription confirmation from the HSS, the MME begins pages the UE to be migrated using the latest tracking information of each UE (e.g., the tracking information provided to the MME during initial authentication or later).

At step 280, each UE receiving a paging request connects to the mobile network for a minimum time duration before trying to opportunistically reconnect to a WAP.

The method 200 then proceeds to step 220.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for managing user equipment (UE) communications, comprising:
    receiving, at a wireless access point (WAP) communicating with UE previously attached to a mobile network, respective UE network allocation vector (NAV) information and respective UE WiFi frames including WiFi frames having a Connection Information (CI) field having stored therein a corresponding UE identifier;
    forwarding, toward a WiFi controller configured to manage the WAP and the UE connected to the WAP, one or more messages including the identifier of UE exhibiting NAV values above a threshold amount, said one or more messages configured to cause the WiFi controller to initiate a migration of UE exhibiting NAV values above the threshold amount to the mobile network.

2. The method of claim 1, wherein the CI field is included within a payload portion of a WiFi frame.

3. The method of claim 1, wherein the CI field is included within a reserved frame type or subtype of a WiFi frame.

4. The method of claim 1, wherein the NAV information received from each UE is an averaged NAV count for the UE.

5. The method of claim 1, wherein the NAV information received from each UE is an indication of an averaged NAV count above a threshold level for the UE.

6. The method of claim 1, wherein each of a plurality of service tiers has associated with it a respective NAV count threshold level.

7. The method of claim 1, wherein each UE is configured to preferentially connect to an available WAP in response to entering a mobile network idle state.

8. The method of claim 1, wherein the WiFi controller initiates a migration of UE by transmitting the UE identifier to a mobility management entity (MME) of a 4G mobile network.

9. The method of claim 8, wherein each UE is configured to preferentially connect to an available WAP in response to entering a mobile network idle state.

10. The method of claim 1, wherein the UE identifier comprises an international mobile subscriber identifier (IMSI).

11. The method of claim 1, wherein the UE identifier comprises one of an international mobile subscriber identifier (IMSI), International Mobile Equipment Identity (IMEI), mobile equipment identifier (MEID), and Electronic serial numbers (ESN).

12. A system for managing user equipment (UE) communications in a converged network, comprising:
    at least one wireless access point (WAP) configured to provide network services to UE connected thereto in response to WiFi frames received therefrom, said WiFi frames including WiFi frames having a Connection Information (CI) field having stored therein a corresponding UE identifier for UE previously attached to a mobile network, said WAP further configured to transmit UE identifiers of currently connected UE toward a WiFi controller configured to manage the WAP and the UE connected to the WAP;
    said WiFi controller being configured to use the UE identifier of currently connected UE to initiate a migration of at least some of said UE from a WAP to the mobile network in response to an indication of a congestion condition at the WAP.

13. The system of claim 12, wherein the indication of a congestion condition at the WAP comprises an average UE network allocation vector (NAV) count above a threshold level.

14. The system of claim 12, wherein each of a plurality of service tiers has associated with it a respective NAV count threshold level.

15. A tangible and non-transient computer readable storage medium storing instructions which, when executed by a computer, adapt the operation of the computer to provide a method for managing user equipment (UE) communications, the method comprising:
    receiving, at a wireless access point (WAP) communicating with UE previously attached to a mobile network, respective UE network allocation vector (NAV) information and respective UE WiFi frames including WiFi frames having a Connection Information (CI) field having stored therein a corresponding UE identifier;
    forwarding, toward a WiFi controller configured to manage the WAP and the UE connected to the WAP, one or more messages including the identifier of UE exhibiting NAV values above a threshold amount, said one or more messages configured to cause the WiFi controller to initiate a migration of UE exhibiting NAV values above the threshold amount to the mobile network.

* * * * *